United States Patent [19]

Tanikawa et al.

[11] Patent Number: 5,651,574
[45] Date of Patent: Jul. 29, 1997

[54] MICROMANIPULATOR

[75] Inventors: Tamio Tanikawa; Tatsuo Arai, both of Tsukuba, Japan

[73] Assignee: Agency of Industrial Science & Technology, Ministry of International Trade & Industry, Tokyo, Japan

[21] Appl. No.: 552,844

[22] Filed: Nov. 3, 1995

[30]     Foreign Application Priority Data

Nov. 9, 1994  [JP]  Japan .................................. 6-300307

[51] Int. Cl.$^6$ .................................................. B25J 15/08
[52] U.S. Cl. ............................ 294/86.4; 414/739; 901/29; 901/34; 901/37
[58] Field of Search ........................ 414/729, 733, 414/735, 738, 739; 901/28, 29, 30, 34, 37; 294/86.4; 74/490.07

[56]               References Cited

U.S. PATENT DOCUMENTS

| 4,850,631 | 7/1989 | Dotsko | 294/86.4 |
| 5,053,687 | 10/1991 | Merlet | 901/29 X |
| 5,114,300 | 5/1992 | Shahinpoor et al. | 414/729 |

FOREIGN PATENT DOCUMENTS 6-104308  12/1994  Japan.

*Primary Examiner*—Donald W. Underwood
*Attorney, Agent, or Firm*—Oblon, Spivak, McClelland, Maier & Neustadt, P.C.

[57]               ABSTRACT

A micromanipulator comprises an upper parallel linkage connecting a base member and an opposed middle plate by links, a lower parallel linkage connecting the middle plate and an opposed base plate by links, a first finger attached to the base member of the upper parallel linkage, a second finger attached to the middle plate and is arranged opposite the first finger, drive controllers provided on the links for effecting relative motions of the fingers and for positioning the fingers.

2 Claims, 3 Drawing Sheets

MICROMANIPULATOR

BACKGROUND OF THE INVENTION

1. Field of the Invention

The present invention relates to a two-finger micromanipulator for use in biotechnology, medicine, and various industrial fields in which micromanipulation is required.

2. Description of the Prior Art

In JPB Hei 6-104308 one of the present inventors proposed a microhand having two fingers for manipulating minute objects. The basic configuration of this two-finger microhand is as shown in FIG. 4. The two-finger hand employs a pair of hand modules 100 utilizing parallel linkages with six degrees of freedom. Each of the hand modules 100 has a base plate 101 and a base member 104 with a finger 102. The base plate 101 and base member 104 are connected by six spring links 105. The six links 105 are divided into two groups of three each. The links of both groups are connected with the base plate 101 and base member 104 at points uniformly spaced along circles whose centers are the axial centers of the base plate 101 and base member 104, but with the links of one group inclined in the opposite direction from those of the other group. Each of the links 105 is provided with an actuator that extends and contracts the links 105.

A problem with this arrangement is that, since the links 105 are held between the base plate 101 and the base member 104 by spring force, the micromanipulator is liable to break down structurally when exposed to an external force exceeding the spring force. Another problem is that the micromanipulator is unable to follow rapid movements.

To overcome these problems, in U.S. Pat. No. 5,476,357 one of the inventors proposed using flexible metal wire members at each end of the six links 105 to connect the links with the base member 104 and base plate 101. This eliminated the problems that arise from the use of springs. However, it is difficult to control the hand modules 100 with the high level of coordination required to manipulate minute objects. A further problem is that the hand modules 100 have only a small operating range.

The fingers resemble chopsticks. Observation of the way a person uses chopsticks shows that interlocking motions of the whole hand are used, with fine manipulations done by the chopstick moved by the index finger and the other chopstick held steady. Based on these observations, it is desirable to divide the functions of the above microhand so that the finger corresponding to the index finger chopstick is controlled for mainly fine gripping operations by producing fine, relative motions, while the finger corresponding to the other chopstick is mainly used for positioning over a large operational space. This enables the shortcomings of the conventional micromanipulator arrangements to be resolved.

The present invention was achieved in light of the foregoing findings and has as its object to provide a two-finger micromanipulator that enables objects to be readily manipulated within a large operating region by fine relative motions that are easy to control.

A further object of the present invention is to provide a two-finger micromanipulator that enables objects to be readily manipulated using a simple mechanism, comprising an upper parallel linkage for driving micromanipulator fingers to make mainly fine relative motions, and a lower parallel linkage mainly for positioning in a large operating space.

SUMMARY OF THE INVENTION

The invention achieves this object by providing a micromanipulator comprising upper parallel linkage connecting a base member and an opposed middle plate by links, lower parallel linkage connecting the middle plate and an opposed base plate by links, a first finger attached by its base to the base member of the upper parallel linkage from which the first finger extends upwards a second finger attached by its base to the middle plate from which the second finger extends upwards in opposition to the first finger, first drive controllers provided on links connecting the base member and the middle plate for effecting relative motions of the first and second fingers, and second drive controllers provided on links connecting the middle plate and the base plate for controlling positioning of the first and second fingers.

The present invention also achieves the above object by providing a micromanipulator thus constituted, wherein the upper parallel linkage connecting the base member and the middle plate is comprised of six links connected at one end to one of three substantially equally spaced connection points provided along a peripheral portion of a lower surface of the base member, and at another end to one of three substantially equally spaced connection points provided along a peripheral portion of the middle plate offset about 60 degrees from the three connection points of the base member, two links being connected with each connection point to be inclined in opposite directions from each other, the first drive controllers are constituted by actuators provided one on each of the six links for extending and contracting the links, the lower parallel linkage connecting the middle plate and the base plate is comprised of six links connected at one end to one of three substantially equally spaced connection points provided along a peripheral portion of a lower surface of the middle plate and at another end to one of three substantially equally spaced connection points provided along a peripheral portion of the base plate offset about 60 degrees from the three connection points of the middle plate, two links being connected with each connection point to be inclined in opposite directions from each other, and the second drive controllers are constituted by actuators provided one on each of the six links for extending and contracting the links.

To manipulate an object in a large operating space, the lower parallel linkage is controlled by the second drive controller to position the first and second fingers with respect to the object, while fine relative motions of the fingers are effected by the upper parallel linkage under the control of the first drive controller, to grip and move the object, for example. The accurate positioning and manipulation of an object are therefore facilitated, even when the object is in a large operating space.

The above and other features of the present invention will become apparent from the following description made with reference to the drawings.

DESCRIPTION OF THE PREFERRED EMBODIMENT

Figure 1:
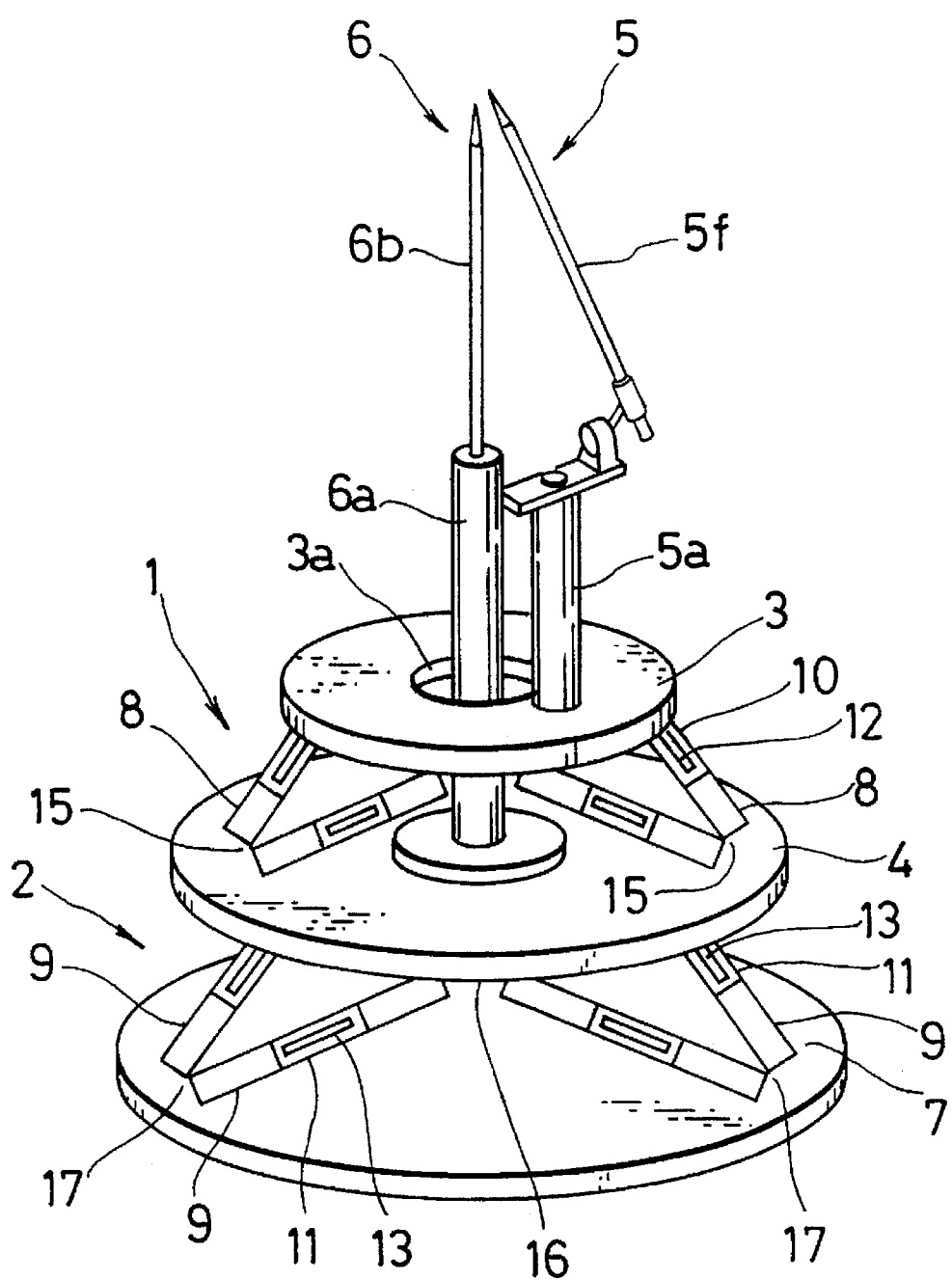
FIG. 1 is a perspective view showing the configuration of the two-finger micromanipulator according to the present invention.
Figure 2:
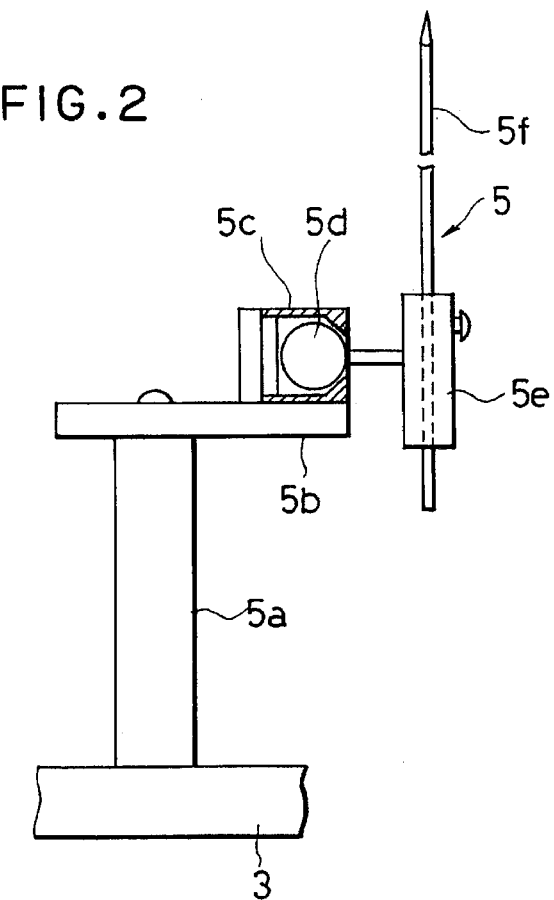
FIG. 2 is a cross-sectional view showing details of the first finger of the manipulator of FIG. 1.

FIGS. 1 and 2 show the configuration of an embodiment of the micromanipulator of the invention, comprising an upper parallel linkage 1 and a lower parallel linkage 2 arranged in concentric opposition to each other. The upper parallel linkage 1 includes a circular base member 3 with a central hole 3a and a circular middle plate 4 disposed in opposition to the base member 3. The base member 3 and middle plate 4 are connected by a linkage mechanism constituted by six links 8.

The lower parallel linkage 2 includes the same middle plate 4 that is also a component of the upper parallel linkage 1, and a base plate 7 disposed in opposition to the middle plate 4. The middle plate 4 and the base plate 7 are connected by a linkage mechanism constituted by six links 9.

A first finger 5 is attached at its base 5a to the upper surface of the base member 3, with the tip of the first finger 5 extending upwards. As shown by the detailed illustration of the first finger 5 shown in FIG. 2, the first finger 5 includes a support 5a constituting the base, a mount 5b attached to the support 5a by a screw, a ball joint 5c attached at one end of the mount 5b, a sleeve 5e associated with the ball 5d of the ball joint 5c, and a slender rod 5f constituting the tip portion of the finger, the rod 5f being affixed in the sleeve 5e. The rod 5f is supported by the ball joint 5c in a way that allows the rod 5f to be moved in a desired direction.

A second finger 6 is attached at its base 6a to a circular plate located at the center of the middle plate 4, from which the tip portion of the second finger 6 extends up through a hole 3a in the center of the base member 3. The second finger 6 includes a base 6a and a slender rod 6b forming the tip portion of the second finger 6. The slender rods 6b and 5f of the second and first fingers 6 and 5 are arranged opposite each other to effect fine relative motions therebetween.

As mentioned, the base member 3 and middle plate 4 are connected by the six links 8. The main function of the linkage constituted by the links 8 is to effect fine relative movements of the first and second fingers 5 and 6. As has also been mentioned, the middle plate 4 and base plate 7 are connected by a linkage constituted by the six links 9, the main function of which is to position the first and second fingers 5 and 6 with respect to an object in a large operating space.

Figure 3:
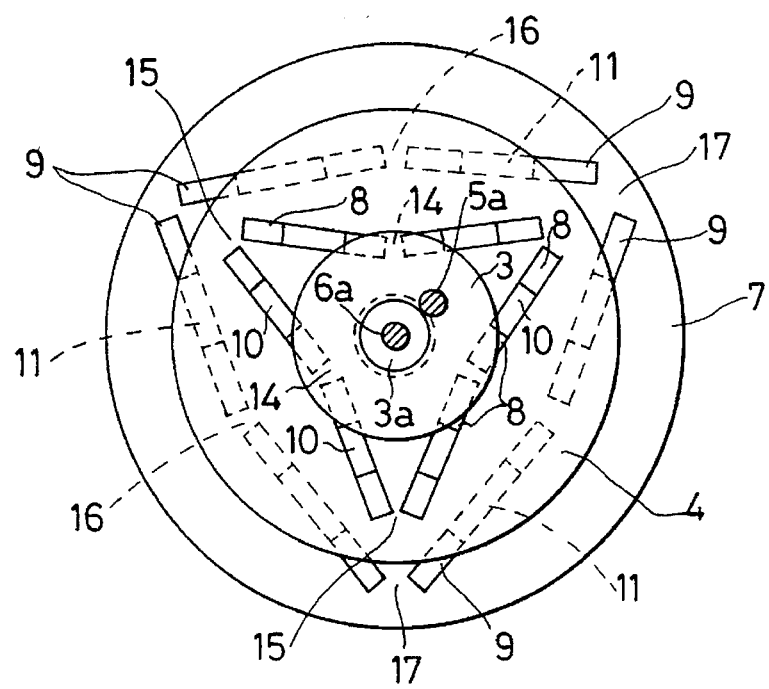
FIG. 3 is a plan view showing the configuration of the upper and lower parallel linkages of the micromanipulator shown in FIG. 1.
Figure 4:
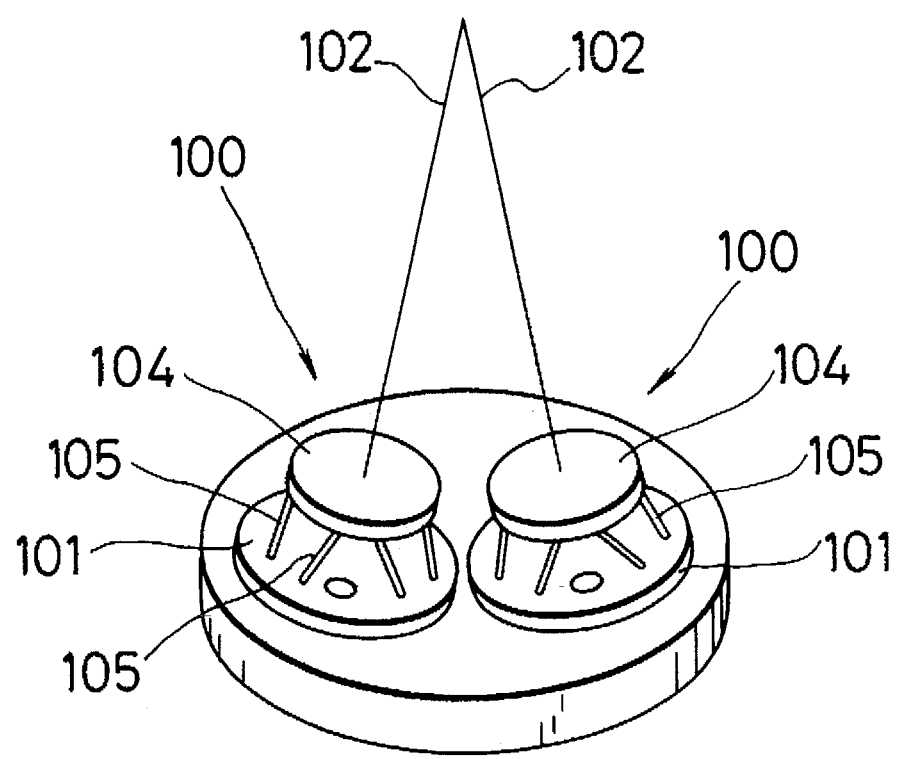
FIG. 4 is a perspective view showing the overall configuration of a conventional two-finger micromanipulator.

As shown in FIG. 3, the six links 8 of the upper parallel linkage 1 are attached at one end to one of three substantially equally spaced connection points 14 provided along the periphery on the undersurface of the base member 3, and at the other end to one of three substantially equally spaced connection points 15 provided along the periphery on the middle plate 4 offset about 60 degrees from the three connection points 14 on the base member 3, two links 8 being attached to each connection point to be inclined in opposite directions from each other.

In similar fashion to the arrangement of the upper parallel linkage 1, the six links 9 of the lower parallel linkage 2 are attached at one end to one of three substantially equally spaced connection points 16 provided along the periphery on the undersurface of the middle plate 4, and at the other end to one of three substantially equally spaced connection points 17 provided along the periphery of the base plate 7 offset about 60 degrees from the three connection points 16 of the middle plate 4, two links 8 being attached to each connection point to be inclined in opposite directions from each other. The methods disclosed in U.S. Pat. No. 5,476,357 can be effectively applied to attach the links 8 and 9 to the base member 3, middle plate 4 and base plate 7. The connection points on the upper parallel linkage 1 and lower parallel linkage 2 can be used with or without a mutual offset.

Each of the links 8 is provided with an actuator 10 and each of the links 9 is provided with an actuator 11 for extending and contracting the links. These actuators form first drive control means for operating the upper parallel linkage 1 and second drive control means for operating the lower parallel linkage 2. The actuators may be constituted by stacked piezoelectric elements, for example. Since the actuators 11 on the lower parallel linkage 2 are used to effect positioning with respect to objects in large operating spaces, if necessary it may be desirable to use actuators 11 that effect more extension and contraction than the actuators 10 used for the upper parallel linkage 1.

While the piezoelectric elements used for precise positioning exhibit rapid response, fine displacement and high output, their very large hysteresis makes it impossible to attain accurate positioning using only open-loop control of the drive voltage. It is therefore preferable to use feedback control based on measured displacement, for which the micromanipulator needs to be provided with a compact displacement measurement means and a servo drive system.

As a means for measuring displacement, there may be used strain gages 12 and 13 directly bonded to each of the piezoelectric element actuators 10 and 11 to extend in the direction of its elongation. The servo system for the drive control of the piezoelectric elements may, for example, be a software servo system using a computer or an analog servo system employing operational amplifiers.

Control operations of the two-finger micromanipulator will now be described. The lower parallel linkage 2 is controlled by the six links 9 driven by operating the actuators 11 to position the first finger 5 and second finger 6 with respect to the object. The upper parallel linkage 1 is controlled by the six links 8 driven by operating the actuators 10 to effect fine relative motions of the first finger 5 and second finger 6.

More specifically, the actuators 11 of the six links 9 are operated to extend/contract the links 9 by a prescribed amount to position the first finger 5 and second finger 6 with respect to an object in a large operating space, and the strain gages 12 detects the displacement amount of each of the links 9. These displacement amounts are used to calculate the current positions of the first finger 5 and second finger 6, which are fed back and compared with preset prescribed positional values for the fingers 5 and 6, thereby effecting servo operation of the actuators 11 until there is no deviation from the set values.

Actuators 10 are operated to extend/contract the six links 8 by a prescribed amount to effect fine relative motions of the first finger 5 and second finger 6 with respect to the positioned second finger. As in the positioning described above, in effecting these relative motions the displacement of the links 8 as detected by the strain gages 12 is used to calculate the relative mutual positions of the first finger 5 and second finger 6 and effect servo operation of the actuators 10 to produce the prescribed relative motion of the fingers 5 and 6. Then the lower parallel linkage 2 only needs to be controlled to, for example, move to a prescribed place an object gripped by the fingers 5 and 6.

Thus dividing manipulator functions between the upper and lower parallel linkages broadens the operational region and also enables fine relative motions to be effected within the expanded region, thereby facilitating the manipulation of objects.

The above-described two-finger micromanipulator can be effectively applied to the grasping, positioning by translational and rotational motion, gripping, pressing, cutting, stretching, compressing, perforating, mixing and propelling of minute objects (for example, cells) with sizes on the order of several micrometers.

As described in the foregoing, specific manipulation functions are divided between an upper parallel linkage and a lower parallel linkage arranged in opposition to each other. This simplifies the configuration, enables the upper parallel linkage to be used mainly for effecting fine relative motions, the lower parallel linkage to be used mainly for effecting positioning in a large operational space, and by enabling the manipulator to be positioned accurately even with respect to an object in a large operational space, facilitates manipulation.

What is claimed is:

1. A micromanipulator comprising:

upper parallel linkage comprising a base member and an opposed middle plate and links connected therebetween, lower parallel linkage comprising the middle plate and an opposed base plate and links connected therebetween, a first finger attached by its base to the base member of the upper parallel linkage from which the first finger extends upwards, a second finger attached by its base to the middle plate from which the second finger extends upwards in opposition to the first finger first drive controllers provided on links connecting the base member and the middle plate for effecting relative motions of the first and second fingers, and second drive controllers provided on links connecting the middle plate and the base plate for controlling positioning of the first and second fingers.

2. A micromanipulator according to claim 1, wherein the upper parallel linkage connecting the base member and the middle plate is comprised of six links connected at one end to one of three substantially equally spaced connection points provided along a peripheral portion of a lower surface of the base member, and at another end to one of three substantially equally spaced connection points provided along a peripheral portion of the middle plate offset about 60 degrees from the three connection points of the base member, two links being connected with each connection point to be inclined in opposite directions from each other, the first drive controllers are constituted by actuators provided one on each of the six links for extending and contracting the links, the lower parallel linkage connecting the middle plate and the base plate is comprised of six links connected at one end to one of three substantially equally spaced connection points provided along a peripheral portion of a lower surface of the middle plate and at another end to one of three substantially equally spaced connection points provided along a peripheral portion of the base plate offset about 60 degrees from the three connection points of the middle plate, two links being connected with each connection point to be inclined in opposite directions from each other, and the second drive controllers are constituted by actuators provided one on each of the six links for extending and contracting the links.

* * * * *